United States Patent [19]

Murata et al.

[11] Patent Number: 4,853,750
[45] Date of Patent: Aug. 1, 1989

[54] DOCUMENT HOLDER FOR A COPIER AND HINGE MECHANISM THEREFOR

[75] Inventors: Mitshiro Murata, Nara; Naofumi Okada, Tenri; Kazutoshi Yamamoto, Nara; Takuharu Tanimoto; Tokuyasu Inoue, both of Hiroshima, all of Japan

[73] Assignee: Sharp Kabushiki Kaisha, Osaka, Japan

[21] Appl. No.: 160,139

[22] Filed: Feb. 25, 1988

[30] Foreign Application Priority Data

Feb. 26, 1987 [JP]  Japan ................................. 62-46150
Feb. 27, 1987 [JP]  Japan ................................. 62-46336

[51] Int. Cl.⁴ ............................................. G03B 27/62
[52] U.S. Cl. ..................................................... 355/75
[58] Field of Search .................... 355/8, 3 SH, 14 SH, 355/50, 75, 76

[56] References Cited

U.S. PATENT DOCUMENTS

| | | | |
|---|---|---|---|
| 4,172,660 | 10/1979 | Yanofsky et al. | 355/75 |
| 4,365,893 | 12/1982 | Kimura et al. | 355/75 |
| 4,530,598 | 7/1985 | Kajita et al. | 355/75 |
| 4,551,014 | 11/1985 | Nakatomi et al. | 355/75 |
| 4,585,329 | 4/1986 | Landa | 355/75 X |
| 4,588,290 | 5/1986 | Ohtsuka | 355/76 |
| 4,739,376 | 4/1988 | Kanekol | 355/75 |
| 4,764,788 | 8/1988 | Watashi et al. | 355/75 X |

*Primary Examiner*—Richard A. Wintercorn
*Attorney, Agent, or Firm*—Flehr, Hohbach, Test, Albritton & Herbert

[57] ABSTRACT

A document holder for holding a document sheet on top of and against a document table of a copier is connected to the housing structure of the copier and can be opened and closed with respect to the document table with hinge mechanisms. Each hinge mechanism has a plate adjustably attached to the side surface of the copier housing structure and supports a spring for applying a biasing force on the other hinge plate attached to the document holder. The spring applies its force through a cover piece having a cam surface such that the document holder can be kept open at any angular position and no biasing force acts on it when it is closed.

9 Claims, 9 Drawing Sheets

DOCUMENT HOLDER FOR A COPIER AND HINGE MECHANISM THEREFOR

BACKGROUND OF THE INVENTION

This invention relates to a document holder which can be opened and closed with respect to the document table of a device such as a copier and serves to hold an original document sheet against the document table while it is optically scanned to have its image read and processed. This invention also relates to a mechanism for opening and closing such a document holder with respect to the document table.

Optical image processing apparatus such as copiers are for reading and processing the image on an original document sheet and are provided with a document table adapted to have a document sheet placed thereon for a scanning operation. The document table is normally disposed at the top of the housing of the apparatus such as a copier of which it is a part and is usually made of a transparent glass material such that the document sheet placed thereon can be optically scanned by a light beam from the opposite side of the table. A document holder is attached to the housing of the apparatus below such that it can be opened from the document table and also can press a document sheet tightly against it when it is closed. In addition, the document holder serves to shield from external light the document sheet being scanned.

Some document holders are intended not only to hold an original in position but also to automatically transport a document sheet to a designated scanning position by means of a document feeder. The document feeder is generally disposed opposite to the document table and serves to automatically transport an original to be copied onto the table and discharge it after it has been processed. In general, many document sheets are stacked on top of a document supply table and they are transported onto the table one sheet at a time in response to a control command. After each sheet is moved to the scanning position and optically scanned, it is discharged into a discharge tray and the next sheet on the supply table is transported onto the table. Even those document holders incorporating such an automatic document feeder are provided with a hinge mechanism because some originals to be scanned cannot be fed automatically and must be manually brought to the scanning position by opening the holder.

Prior art document holders are attached to the apparatus below typically by means of hinges with one part affixed to its top surface along one edge of the document table, the other part being affixed to the document holder such that the document holder can be opened and closed around the pins of these hinges. The hinge mechanism is provided with biasing means such as coil springs for applying a biasing force in the direction of opening the document holder. In order to keep the document holder open at a desired angular position, however, cams and many other components are required and the prior art hinge mechanisms are generally very complicated. In addition, it is extremely troublesome to correctly adjust such springs such that their biasing force will exactly balance the weight of the document holder at the desired angle. If the adjustment is not correctly made and the gravitational torque on the document holder is greater than the biasing force of the springs, for example, the document holder cannot maintain an open position and starts closing. In order to maintain this balance, the positions of the sprigs must be carefully adjusted and the biasing strength of each spring must be correctly set. Document holders incorporating an automatic document feeder, in particular, are heavier and correspondingly stronger springs are required. Such document holders are therefore more complicated in structure and costlier to produce.

Another disadvantage of prior art hinge mechanisms for a document holder as described above has been that the biasing springs which are compressed when the document holder is closed tend to exert a diagonally upward force on the structure holding the document sheet and since this force is applied at the positions of the hinges, the document holder is subjected to a shearing stress. If the document holder becomes bent, not only does it fail to protect the document sheet from outside light but the document feeder therein becomes unable to correctly transport a document sheet to the scanning position.

SUMMARY OF THE INVENTION

It is therefore an object of the present invention to provide a document holder for a copier and the like with improved hinge mechanisms of a simple structure by which it can be easily opened and closed with respect to the document table.

It is another object of the present invention to provide such a document holder which can be kept open at any angle.

It is still another object of the present invention to provide such a document holder which, when closed, can effectively shield the sheet on the document table from external light.

It is still another object of the present invention to provide such a document holder which is not subjected to a unreasonable stress by biasing means provided for applying a force tending to open it.

A document holder which achieves the above and other objects of the present invention is attached to a copier and the like by hinge mechanisms of which one of the hinge plates (hereinafter referred to for convenience as the first hinge plate) not to the top surface of the apparatus below but onto its side surface. The other (second) hinge plate, rotatably connected to the first hinge plate and affixed to the document holder which thus can be opened and closed, includes an axis on which a spring attached to the first hinge plate exerts a biasing force. A cover piece through which the spring pushes the axis has a cam surface with a sloped section and a arcuate section. When the document holder is opened, the biasing force of the spring is communicated to the axis through the sloped section and balances the rotational moment of the document holder effectively. When the document holder is closed, the axis falls into the arcuate section and the biasing force, acting vertically upward, does not tend to open the document holder.

BRIEF DESCRIPTION OF THE DRAWINGS

The accompanying drawings which are incorporated in and form a part of the specification, illustrate an embodiment of the present invention and, together with the description, serve to explain the principles of the invention. In the drawings.

DETAILED DESCRIPTION OF THE INVENTION

Figure 1:
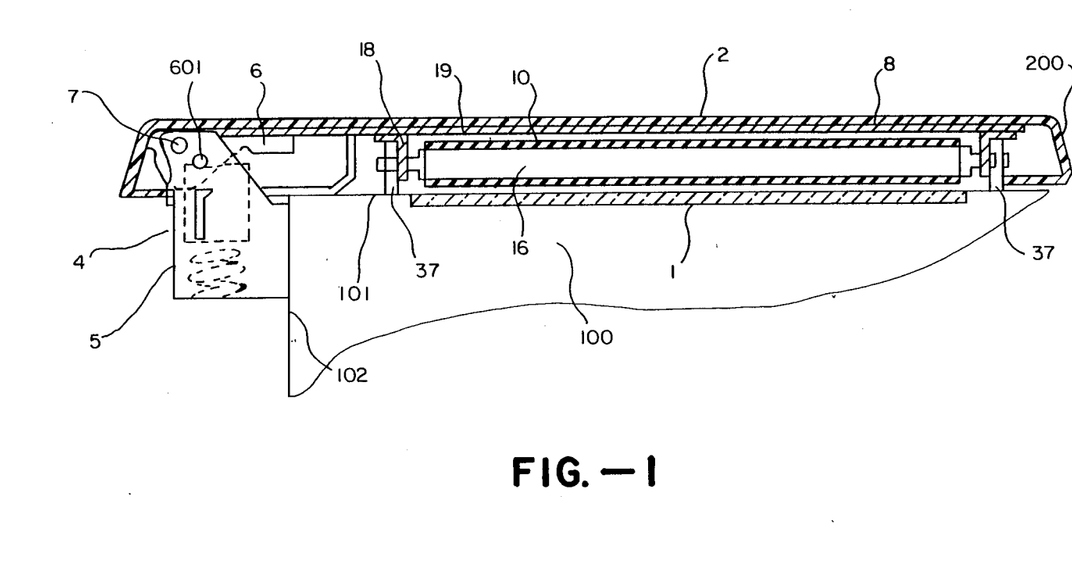
FIG. 1 is a sectional view of a document holder with hinge mechanisms embodying the present invention when it is closed.
Figure 2:
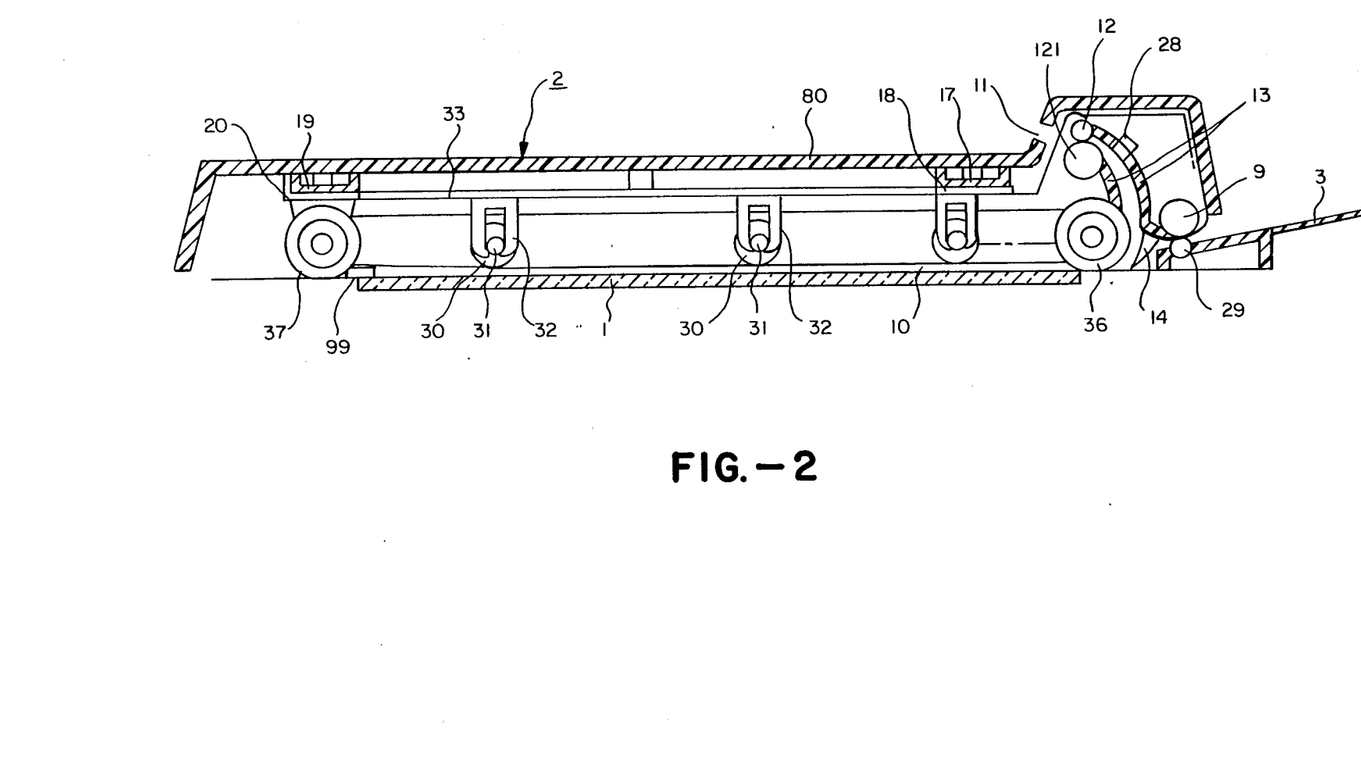
FIG. 2 is a sectional view of a document holder incorporating an automatic document feeder.
Figure 3:
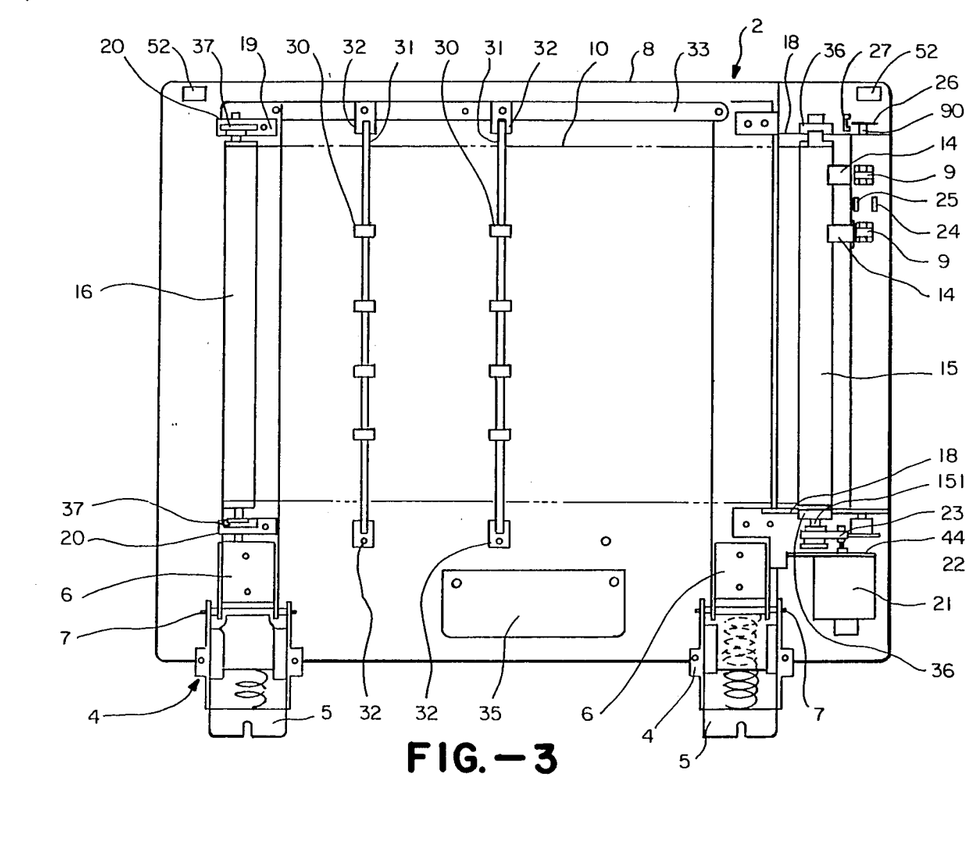
FIG. 3 is a plan view of the document holder of FIG. 2 seen from inside when it is opened.

With reference to FIGS. 1, 2 and 3, numeral 1 indicates a document table made of a transparent glass material which is provided at the top part of the housing of a copier 100 and numeral 2 indicates a document holder embodying the present invention, or the main body thereof, which can be opened and closed with respect to the document table 1 and is provided with an automatic document feeder. Numeral 200 indicates a part of the document holder 2 which serves to actually hold the document sheet firmly on the document table 1 and numeral 3 indicates a supply table for supply document sheets therefrom to the document feeder provided to the document holding part 200 of the document holder 2. This supply table 3 is firmly affixed to the top part of the copier main housing 100 and hence does not open or close with the document holder 2. A stopper 99 is provided at one end of the document table 1 to limit the motion of an incoming document sheet, serving as a reference position for its front edge.

Hinge mechanisms 4 are provided along one side of the document holder 2. Each hinge mechanism 4 includes a first hinge plate 6 affixed to a side surface 102 of the copier housing 100 and a second hinge plate 7 which is affixed to an edge section of the holding part 200 of the document holder 2 and rotatably connected to the first hinge plate 6 around a pin 7 such that the document holder 2 can be opened and closed around these hinge pins 7. The structure of these hinge mechanisms 4 will be described below more in detail.

The automatic document feeder incorporated with the holding part 200 and contained in its outer housing piece 8 includes feeding rollers 9, an endless conveyor belt 10 for transporting document sheets one at a time onto the table 1, discharge rollers 12 and 121 for discharging a document sheet through a discharge outlet 11 onto a discharge tray 80 formed on top of the housing piece 8, a discharge guide piece 13 for leading the document sheet to these discharge rollers 12 and 121 and route-switching guide pieces 14 for directing the document sheet towards the discharge guide piece 13 when the document sheet is intended to be discharged. The outlet 11 is formed by removing a portion of the housing piece 8.

The conveyor belt 10 is stretched between conveyor rollers 15 and 16 disposed opposite to edge parts of the document table 1 and is driven by the roller 15. The driving roller 15 is supported rotatably through bearings by frames 18 each affixed at one end to a supporting plate 17 attached directly to the housing piece 8. Similarly, the other conveyor roller 16 is supported rotatably through bearings by supporting members 20 affixed to another supporting plate 19 attached directly to the housing piece 8 parallel to the aforementioned supporting plate 17. One end of the axis 151 of the driving roller 15 penetrates the frame 18 which supports it and is connected to a pulley 22 through which the motive force of a motor (such as a DC motor) 21 is communicated. A driving belt 23 is stretched between a driver pulley on the shaft of this motor 21 and the aforementioned pulley 22 to communicate the rotary power of the motor 21 to the driving roller 15.

The aforementioned frames 18 also support the discharge roller 12 rotatably through bearings or the like, and the rotary power of the motor 21 is also communicated to the other discharge roller 121. They are so adjusted that a document sheet is discharged by the discharge rollers 12 and 121 at nearly the same speed as the speed at which it is transported by the conveyor belt 10. In addition to the discharge roller 12, the axes of the document feeding rollers 9, the discharge guide piece 13, etc. are also attached to the frames 18 to form a single unit. The document feeding rollers 9 are driven independently of the conveyor belt 10, having a separate motor (not shown) such as a DC motor provided to communicate its rotary power to their axes.

Near the document supplying rollers 9 and sandwiched therebetween are document detectors 24 and 25 for detecting a document moving from the document supply table 3. These detectors 24 and 25 may be optical sensors comprised of a light emitting element and a light receiving element. When the first document detector 24 detects the front edge of an incoming document, the document feeding rollers 9 are driven to send the document to the conveyor belt 10. When the second document detector 25 detects the document being thus transported, the feeding rollers 9 are stopped and the document is caused to temporarily wait at this position. The feeding rollers 9 have a shaft 90 with one end protruding from the frame 18 which supports it. Attached to this protruding end of the shaft 90 is a clock disk 26 with slits formed at equal intervals for detecting the length of the document. An optical sensor 27 with a light emitting element and a light receiving element sandwiches this clock disk 26 and measures the length of the document which moves past the document feeding rollers 9 by counting the slit signal (clock pulse) outputted from this optical sensor.

The guide pieces 14 provided between the document feeding rollers 9 and the conveyor belt 10 are rotatably supported such that they normally rotate in the counterclockwise direction with reference to FIG. 2 by their own weight. They can be moved in the clockwise direction by a document sheet transported from the document supply table 3 by the document feeding rollers 9. Thus, an incoming document sheet can pass under the pieces 14 to the document table 1 but when it moves backwards on the document table 1 after it is processed, its front edge is deflected into the discharge route defined by the discharge guide piece 13. A detector 28 similar to those (24 and 25) between the document feeding rollers 9 is provided in the discharge route near the discharge roller 12. When a processed document to be discharged is detected by this detector, a detection signal is transmitted to a control circuit (not shown) which thereupon drives the discharge roller 12 according to the length of the document sheet measured earlier. For example, the discharge roller 12 may be decelerated when the back edge of the document sheet is about 40mm from the position of the discharge roller 12 and the driving force therefore may be switched off when the back edge is about 10 mm from the discharge roller 12.

The roller 15 for driving the conveyor belt 10, the document feeding rollers 9, the document discharge roller 12, the discharge guide piece 13, the guide pieces 14, the motor 21 and the detectors 24, 25 and 28 are unistructurally formed and attached to the frames 18. A contact roller 29 in contact with the document feeding rollers 9 is rotatably supported by the document supply table 3. As shown in FIG. 2, auxiliary rollers 30 are disposed at appropriate intervals inside the belt 10 such that the document sheet can be transported on the document table 1 effectively without slipping. The ends of the shafts 31 of the auxiliary rollers 30 are supported by supporting members 32 such that the shafts 31 are not only rotatable but also movable vertically. When the automatic document feeder 2 is closed as shown in FIGS. 1 and 2, therefore, the rollers 30 move downward by gravity and press the conveyor belt 10 downward against the surface of the document table 1. As shown in FIG. 3, the supporting members 32 on one side of the shafts 31 are affixed to a stay 33 connecting the supporting plates 17 and 19 and those on the other side are directly affixed to the housing piece 8. In FIG. 3, numeral 35 indicates a base board for the control circuit for controlling the overall operation of the document feeder, operating the motor 21 in response to a command signal from the copier, for example, and outputting a signal back to the copier. Numerals 36 and 37 indicate collar-like pieces which are affixed to the axes 151 and 161 of the rollers 15 and 16, respectively, to keep a fixed distance between the conveyor belt 10 and the document table 1.

Figure 4:
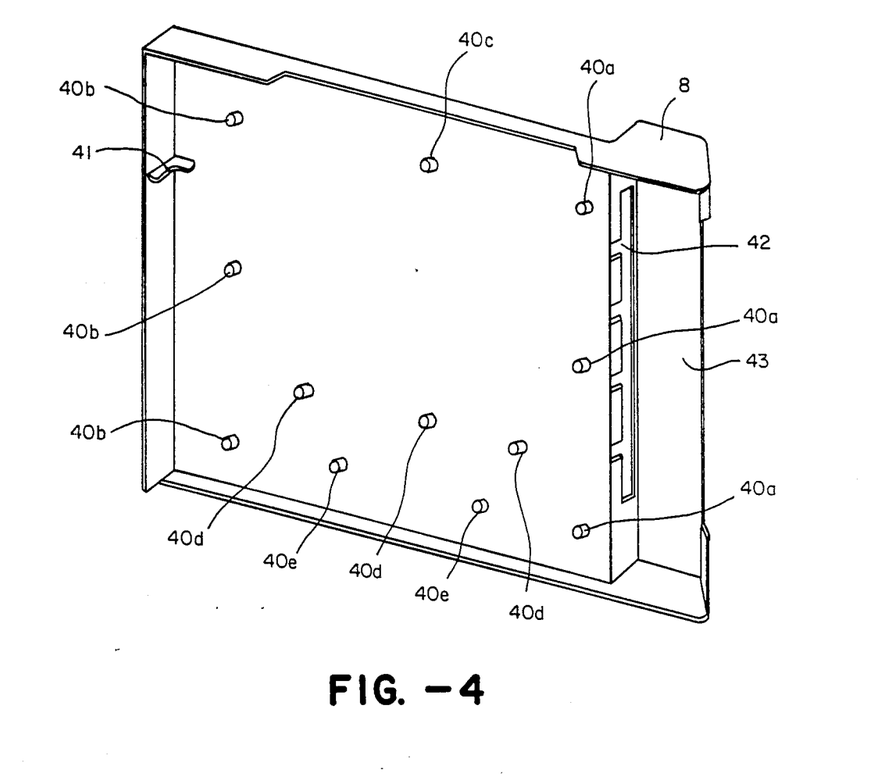
FIG. 4 is a diagonal view of the outer housing piece of the document holder.

Next, the manners in which various components of the document transportation device are attached to the outer housing piece 8 of the document holding part 200 are described. The housing piece 8 which embodies the present invention may be of a plastic material such as ABS resin and, as shown in FIG. 4, a large number of protrusions 40 are unistructurally formed thereon for positioning and securing the supporting members 32 for supporting one side of the shafts 31, the supporting plates 17 and 19, the stay 33, the base board of the control circuit, etc. Female screws may be provided to some of these protrusions 40 for securing the supporting plates 17 and 19, etc. The base board 35 may be affixed directly to the housing piece 8 by tapping screws.

In FIG. 4, numeral 41 indicates a rib which is also unistructurally formed with the housing piece 8 for the purpose of reinforcement. Although only one rib 41 is shown in FIG. 4, any number of them may be provided at appropriate locations. Numeral 42 indicates an opening serving as the outlet 11 through which processed document sheets are discharged. Numeral 43 indicates an indented section of the housing piece 8 for containing an assembly comprised of the drive roller 15, the discharge roller 12, the paper feeding rollers 9, etc. supported by the frames 18.

Figure 5:
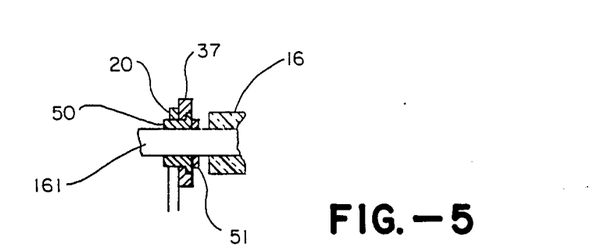
FIG. 5 is a sectional view showing the attachment of the collar-like piece to the roller axis.

The supporting plate 17 is positioned by the protrusions 40a and secured by screws. The supporting plate 19 is positioned by the protrusions 40b and secured by screws. The stay 33 is secured to the plates 17 and 19 by screws at both ends and its center is positioned and secured by the protrusion 40c. The supporting members 20 for rotatably supporting the roller 16 are affixed to the supporting plate 19 by screws and support the ends of the axis 161 of the roller 16 through supporting members 50 as shown in FIG. 5. Attached to each supporting member 50 at one end of the axis 161 is the collar-like piece 37 which, as explained above, serves to keep a fixed distance between the conveyor belt 10 and the document table 1. This distance is usually adjusted to about 0.2-1.5 mm. In FIG. 5, numeral 51 indicates an E-ring for preventing the axis 161 from disengaging and falling off.

Secured to the supporting plate 17 by screws are the frames 18 supporting the document feeding rollers 9, the drive roller 15, etc. The drive roller 15 is rotatably supported by the frames 18 as the roller 16 shown in FIG. 5, that is, the collar-like pieces 36 are attached to the axis 151 of the drive roller 15. These collar-like pieces 36 also serve to keep the conveyor belt 10 at the fixed distance from the document table 1. The hinge plates 6 are attached by screws to end parts of the supporting plates 17 and 19. The motor 21 is secured to one of the frames 18 through an angle 44.

The supporting members 32 for the shafts 31 are affixed to the stay 33 on one side and positioned and secured by the protrusions 40d of the housing piece 8 on the other. For convenience, FIG. 3 does not show every protrusion 40d securing a supporting member 32. The protrusions 40e are provided for securing the base board 35 of the control circuit. Screws are used to secure the base board 35 directly to the outer housing piece 8.

Figure 6:
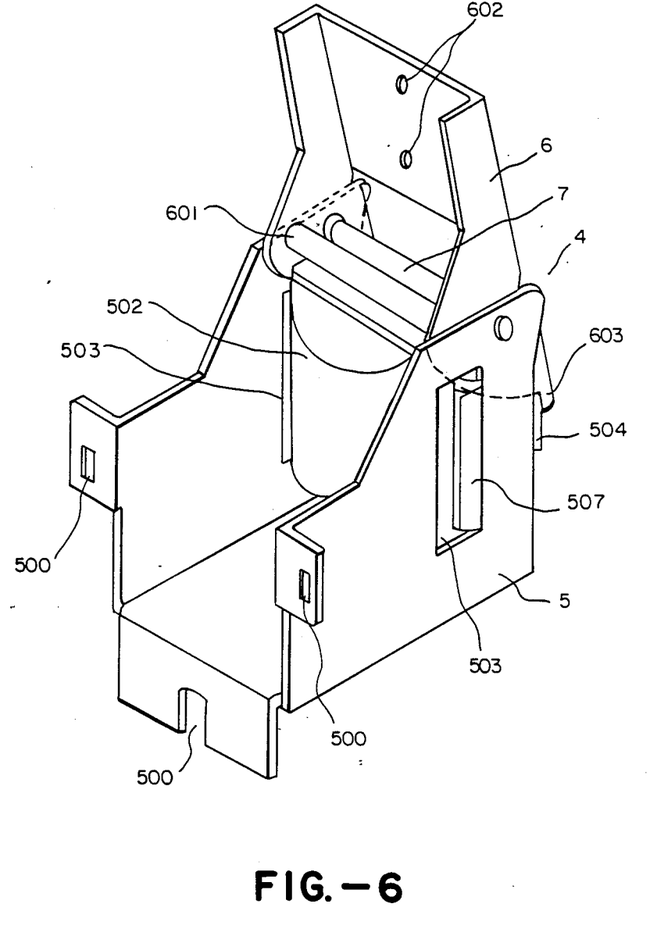
FIG. 6 is a diagonal view of the hinge mechanism embodying the present invention.

Each of the hinge mechanisms 4 for rotatably opening and closing the document holding part 200 of the document holder 2, as briefly described above, has hinge plates 5 and 6 which are rotatably connected to each other around the pin 7 as shown in FIG. 6. The first hinge plate 5 is provided with vertically elongated openings 500 for its attachment onto the side surface 102 of the copier housing 100 by screws. The height of its attachment can be adjusted because these openings 500 are vertically elongated. A coil spring 501 for applying a biasing force on the second hinge plate 6 is contained within the first hinge plate 5 as shown in FIG. 7 and vertically elongated guiding slits 503 are also provided on the hinge plate 5 for vertically guiding a cover piece 502 covering the upper portion of this spring 501.

Figure 8:
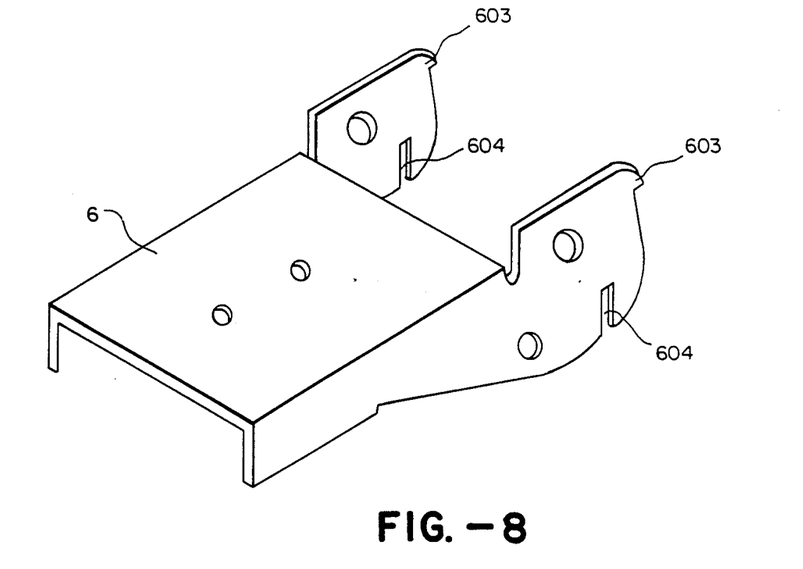
Figure 9:
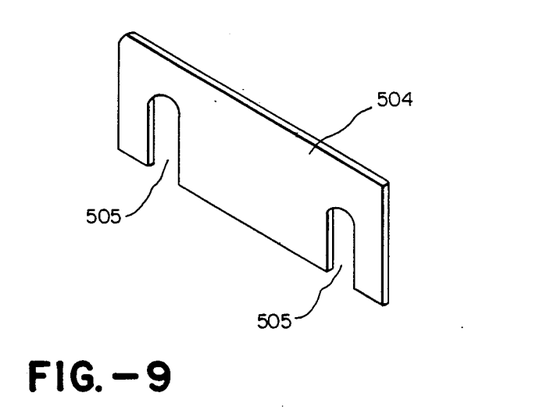

The second hinge plate 6 is provided with an axis 601 parallel to the hinge pin 7. The spring 501, with the cover piece 502 covering its upper part, is inserted between this axis 601 and the base of the first hinge plate 5. Thus, the biasing force of the spring 501 acts on the second hinge plate 6 in the direction of opening the axis 601 around the hinge pin 7. The second hinge plate 6 is provided not only with openings 602 for passing screws therethrough to fasten it onto the document holder 2 (through the supporting plate 17 or 19 as explained above) but also with unistructurally formed protrusions 603 as shown in FIG. 8 which serve to limit the angular displacement of the document holder 2 from its closed position. Corresponding to these protrusions 603, a stopper plate 504 is attached to the first hinge plate 5. As shown in FIG. 9, this stopper plate 504 is provided with elongated holes (or notches) 505 such that its position with respect to the hinge plate 5 can be easily adjusted. Numerals 604 indicate slits which are also provided to the second hinge plate 6 for inserting the stopper plate 504 engagingly therethrough for keeping the document holder 2 in the closed condition and preventing it from opening. This is useful when, for example, the copier is being transported.

Figure 10:
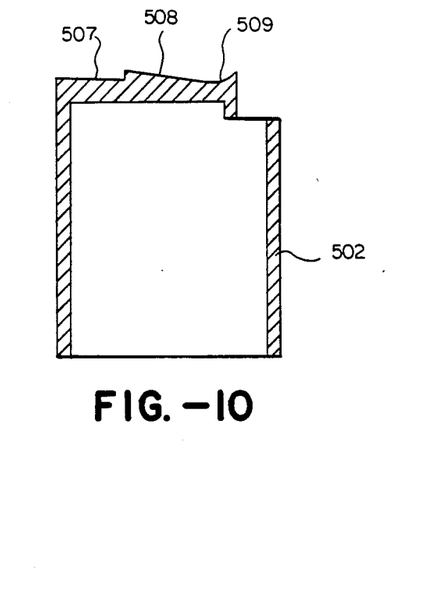
Figure 11:
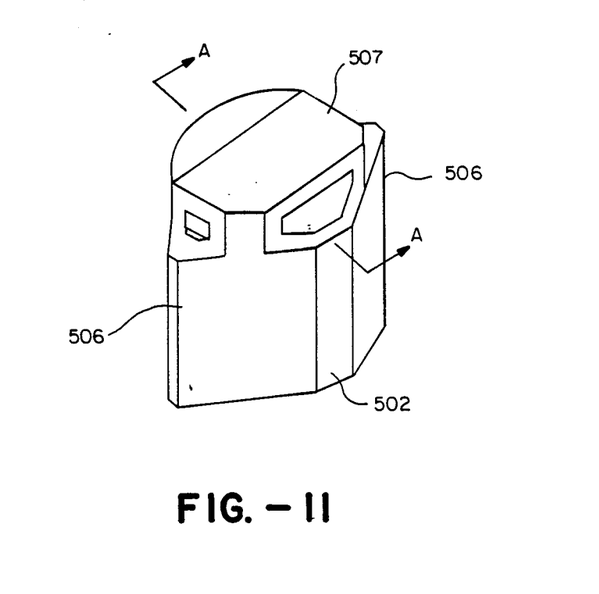

The cover piece 502 for the spring 501 is provided with somewhat protruding guide pieces 506 on opposite sides as shown in FIG. 11 for engaging with the guiding slits 503 formed in the hinge plate 5 such that the cover piece 502 moves vertically. A cam surface 507 is formed on its top surface as shown in FIGS. 10 and 11 for contacting the axis 601. The cam surface 507 includes a sloped section 508 which serves to keep the document holder 2 open at any desired angle and an arcuate section 509 which serves to keep the document holder 2 in its closed position.

Figure 7:
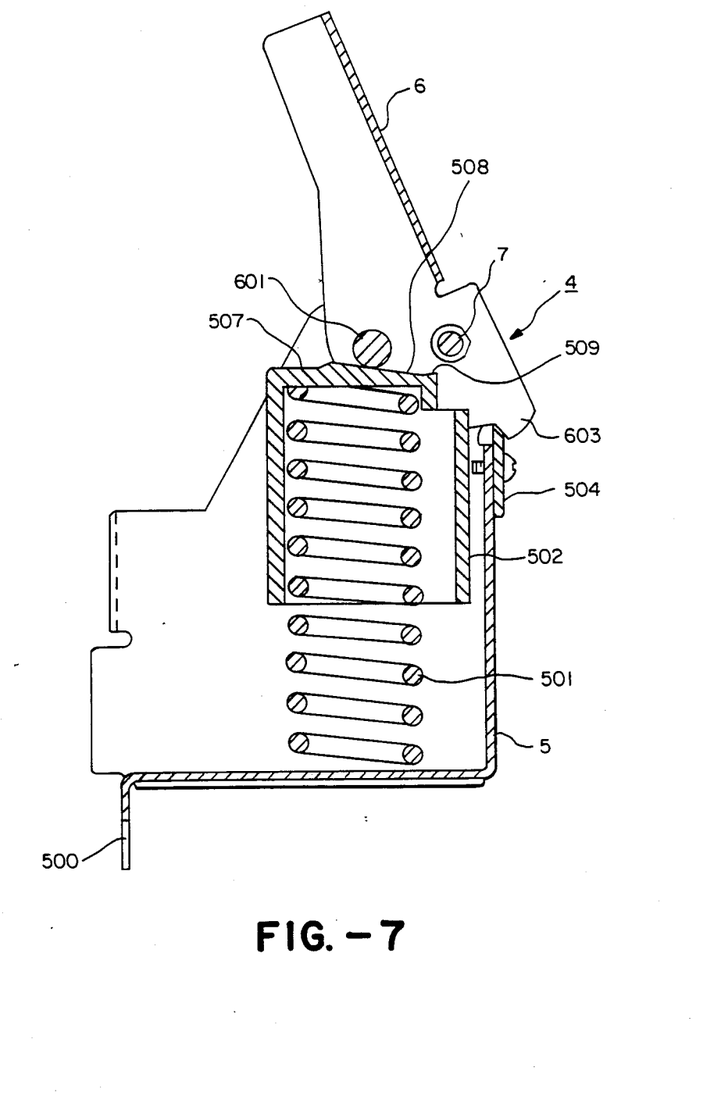
FIG. 7 is a sectional view of the hinge mechanism of FIG. 6, FIGS. 8 and 9 are diagonal views of components of the hinge mechanism of FIGS. 6 and 7, FIGS. 10 and 11 are sectional and diagonal views of the cover piece shown in FIGS. 6 and 7, FIG. 10 being a view taken along the line A—A of FIG. 11.
Figure 12:
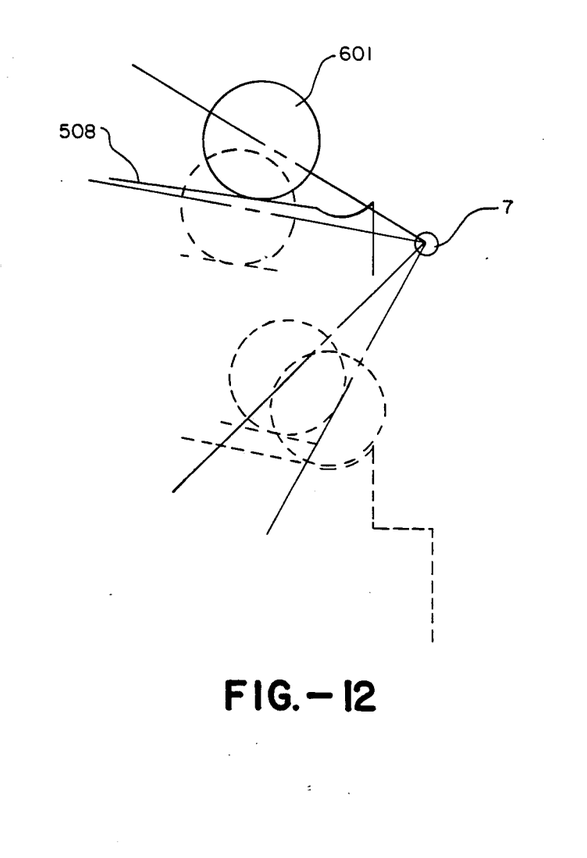
FIG. 12 is a schematic drawing for showing the operation of the hinge mechanism embodying the present invention.

When the document holder 2 is open, the protrusions 603 of the second hinge plate 6 come into contact with the stopper plate 504 as shown in FIGS. 6 and 7, thereby preventing the document holder 2 from opening any further. In this condition, the spring 501 is less strongly compressed and its biasing force tending to open the document holder 2 is reduced. The greater the opening angle of the document holding part 200 of the document holder 2, the smaller becomes the rotational moment tending to close it. Thus, the biasing force of the spring 501 to open it and the rotational moment of the document holder 2 to close balance each other such that its open condition can be maintained. As the document holder 2 is gradually closed, the spring 501 becomes compressed and the biasing force tending to open the document holder 2 also increases. In the meantime, the rotational moment of the document holder 2 increases because of its own weight, thus, the biasing force balances the rotational moment and the document holder 2 can be kept open. The sloped section 508 of the cam surface 507 of the cover piece 502, through which the biasing force of the spring 501 is communicated, is in contact with the axis 601 and pushes the axis 601 diagonally upward. Since the sloped section 508 is sloped in the direction of the hinge pin 7 as shown in FIG. 12, the biasing force of the spring 501 acts tangentially with respect to the hinge pin 7 if the opening angle of the document holder 2 is small, say, less than 10°-20° and the biasing force of the spring 501 acts nearly entirely to push open the axis 601. As the spring 501 is further compressed, the biasing force tending to push the axis 601 obliquely becomes strong in accordance with the angle of the sloped section 508 and the opening angle of the document holder. As the document holder 2 further rotates around the hinge pins 7 and becomes nearly closed, the biasing force of the spring 501 begins to act in the direction of the hinge pin 7 because of the angle of the sloped section 508 and operates to stop the document holder 2 in this position. Thus, the document holder 2 can be stopped at any open position.

As the document holder 2 is closed even further, the axis 601 falls into the arcuate section 509 of the cam surface 5087 at the opening angle of about 10°-20°, In other words, the arcuate section 509 is formed adjacent to the sloped section 508 such that the axis 601 comes off the sloped section 508 when the angle of the document holder 2 reaches a certain predetermined small angle and falls into the arcuate section 509. When the axis 601 falls into the arcuate section 509, the compression of the spring 501 becomes reduced and the opening force also becomes reduced accordingly. Since the rotational moment of the document holder 2 keeps increasing, however, the document holder 2 closes slowly. After the axis 601 falls into the arcuate section 509, furthermore, the biasing force of the spring 501 acts only vertically upward. Since it no longer acts obliquely, it naturally becomes less effective at opening the document holder 2. Thus, after the document holder 2 is closed, it tends to remain closed. Since the spring 501 no longer acts to open it, the document holder 2 does not "float" and can serve to effectively press the document sheet against the document table 1 and shield it from external light. If a document feeder is incorporated, in particular, this serves to maintain a fixed distance between the document table 1 and the conveyor belt 10 such that incoming document sheets can be correctly transported to the scanning position.

Operations of the automatic document feeder, if it is incorporated in the document holder 2 as shown in FIGS. 2 and 3, as well as the motion of a document sheet transported therethrough are explained next in detail. When a document sheet to be copied is inserted along the document supply table 3 and its front edge is detected by the detector 24, the document feeding rollers 9 are activated and the document sheet is transported between the document feeding rollers 9 and contact rollers 29 in contact therewith. When the document sheet is thereafter detected by the next detector 25, the motive force on the feeding rollers 9 is switched off and the sheet waits at this position. When a signal indicative of the wait condition of the document sheet is transmitted to the main body of the copier, the copier begins to get ready for a copying operation. If a copy switch on the main body or a start switch on the document transportation device is operated thereafter, a command signal is transmitted from the copier main body to start the transportation of the document sheet, causing the document feeding rollers 9 and the conveyor belt 10 to start moving simultaneously by activating the motor (not shown) for driving the document feeding rollers 9 and the motor 21 for driving the conveyor belt 10.

While the document sheet is thus transported, its length is measured by counting the clock signal generated by the clock disk 26 attached to the shaft 90 of the feeding rollers 9 until the back edge of the sheet passes the position of the detector 24. The number thus counted is multiplied by the distance traveled by the document sheet during one pulse period and the distance between the detectors 24 and 25 is added to this product to obtain the desired length. The measured length is temporarily stored in a memory device (not shown) on the base board 35 of the control circuit. When the back edge of the incoming document sheet is detected by the detector 25, the force driving the document feeding rollers 9 is switched off and the document sheet is thereafter transported on the document table 1 by the conveyor belt 10. In the meantime, the document feeding rollers 9 get ready to bring the next sheet into the aforementioned wait condition. The conveyor belt 10 is adapted to transport a document sheet at a speed, for example, of about 800-1000 mm/sec. When the front edge of the sheet being transported by the conveyor belt 10 comes within about 60 mm of the stopper 101, the output to the motor 21 is lowered and the speed of the conveyor belt 10 is reduced to about $\frac{1}{2}$-$\frac{1}{4}$ (or about 300 mm/sec). The speed of the conveyor belt 10 should be reduced as much as possible but the load for its operation increases and it may become impossible to accurately control the speed of the motor 21. After the front edge of the document sheet touches the stopper 101, the motor 21 is run for an extra period of time sufficient for moving the conveyor belt 10 by about 10 mm. This is done in part for the purpose of correcting the orientation of the document sheet which may have become disoriented and in part in view of the possibility that the front edge of the document sheet failed to reach the stopper 101 because of the inertial forces of various components. After the document sheet is thus correctly transported to the designated scanning position, a signal indicative of its correct positioning is transmitted to the copier main body and the standard copying operation is started.

After a desired number of copies are made, or after the optical scanning of the document sheet is completed, a command signal is transmitted to the transportation device 2 to discharge the document sheet on the document table 1. The motor 21 is thereupon rotated in the reverse direction and the document sheet is moved backward, what was its back edge now becoming its front edge. The speed of this backward motion is set to be about the same as that of the forward motion of the sheet to the scanning position. The backward-moving document sheet is deflected by the guide pieces 14 as explained above towards the discharge rollers 12 and 121.

The document sheet deflected into the discharge route is sandwiched between the discharge rollers 12 and 21 and discharged onto the discharge tray 80 formed above the outer housing piece 8. As the sheet moving in the discharge route is detected by the detector 28, the speed of its motion controlled by the discharge rollers 12 and 121 is reduced to $\frac{1}{2}$-$\frac{1}{4}$ (about 40 mm) before the back edge of the sheet passes the position of the detector 28. The measured length of the sheet stored in the memory device is used for this control. The motor 22 is temporarily stopped, for example, for about 100 msec when the edge of the sheet comes within about 10 mm of the detector 28, causing the discharge rollers 12 and 121 to stop and hence the sheet sandwiched therebetween to also stop temporarily. After this short period of time, the operation of the motor 21 is restarted and the discharge of the document sheet is resumed at about $\frac{1}{2}$-$\frac{1}{4}$ of the normal speed. Since the front edge of the sheet being discharged drops by it own weight when the sheet is temporarily stopped while being sandwiched between the discharge rollers 12 and 121, and since the sheet is transported onto the discharge tray 80 at a reduced speed, the sheet being discharged is not scattered uncontrollably but the discharge operation can be accomplished efficiently and in an orderly manner. In other words, the discharged sheets can be neatly stacked on the discharge tray 80. When a processed sheet is discharged, the next sheet, if at the aforementioned wait position, is transported to the scanning position as explained above.

In summary, the outer housing piece 8 of the present invention remains flexible because the supporting plates 17 and 19, etc. supporting the various components are directly attached to it such that its shearing strain can be corrected easily and its attachment to the main body of a copier becomes much simplified because there is no need for a cumbersome adjustment process. Since the number of components to be contained in the outer housing piece 8 is significantly reduced, in particular, its assembly and disassembly become easier. Both the overall weight and cost of the device are also reduced.

Moreover, when the document holder 2 of the present invention is closed to cover the document table 1 on top of the copier as shown in FIG. 2, the collar-like pieces 36 and 37 are sure to come into contact with the document table 1 or other top parts of the copier because of the weight of the device itself even if it is in a strained condition. This is in part because the outer housing piece 8 is flexible and the positional relationship between the conveyor rollers 15 and 16 and the document table 1 is determined by these collar-like pieces 36 and 37. Since these pieces 36 and 37 are directly attached to the axes 151 and 161 of these rollers 15 and 16, they also serve directly to maintain a fixed distance between the conveyor belt 10 and the document table 1. This distance can be much more dependably maintained nearly independently of errors in measurements than by spacers and the like which used to be relied upon conventionally. In FIG. 3, numerals 52 indicate magnets, disposed on the opposite side of the document holder 2 from the hinge mechanisms 4. They serve to make the contacts between the collar-like pieces 36 and 37 and the document table 1 even more reliable by the magnetic attraction to the main body of the copier when the device is closed.

In summary, hinge mechanisms for a document holder according to the present invention are characterized as having one of their hinge plates attached to a vertical side surface of the housing of the copier. They are simple in structure and inexpensive to manufacture but can allow the document holder to be opened and closed easily and to remain open at any angle.

What is claimed is:

1. In a document holder including a document holding member for holding a document sheet on a document table at the top of a housing structure having a side surface and hinge mechanisms by which said document holding member can be opened and closed with respect to said document table, the improvement wherein said hinge mechanisms each comprise
    a first hinge plate affixed onto said side surface of said housing structure,
    a second hinge plate attached rotatably to said first hinge plate and affixed to said document holding member, and
    biasing means supported by said first hinge plate for applying a generally upward biasing force on said second hinge plate in the direction of opening said document holding member.

2. The document holder of claim 1 wherein said first hinge plate is affixed to said side surface so as to be vertically adjustable.

3. The document holder of claim 1 wherein said document holding member includes a document feeder.

4. The document holder of claim 2 wherein said document holding member includes a document feeder.

5. The document holder of claim 2 wherein said first hinge plate is provided with vertically elongated attachment holes and/or notches.

6. In a hinge mechanism for allowing a document holder to be opened and closed with respect to a document table on top of a housing structure having a side surface, said document holder serving to hold a document sheet against said document table, the improvement wherein said hinge mechanism comprises
    a first hinge plate affixed to said side surface,
    a second hinge plate rotatably connected to said first hinge plate around a pin and affixed to said document holder, an axis attached to said second hinge plate for rotating said second hinge plate with respect to said first hinge plate, biasing means inserted between said axis and said first hinge plate for biasing said axis in the direction of rotating said second hinge plate with respect to said first hinge plate, and a cover piece which covers an upper part of said biasing means, said cover piece having a cam surface for contacting said axis, said cam surface including a sloped part which applies a biasing force on said axis in the direction of said pin and an arcuate part adjacent to said sloped part, said axis being adapted to fall into said arcuate part when said document holder is substantially closed with respect to said document table.

7. The hinge mechanism of claim 6 wherein said first hinge plate is formed with elongated guiding slits and said cover piece has protrusions adapted to slide along said slits to cause said cover piece to move in the direction of said slits.

8. The hinge mechanism of claim 6 wherein said first hinge plate has vertically elongated attachment holes and/or notches for passing screws therethrough such that the vertical position of said first hinge plate on said side surface can be adjusted easily.

9. The hinge mechanism of claim 6 wherein said document holder contains a document feeder.

* * * * *